No. 732,631. PATENTED JUNE 30, 1903.
C. HAMBUECHEN.
ASYMMETRIC CONDUCTOR.
APPLICATION FILED JAN. 19, 1903.
NO MODEL.
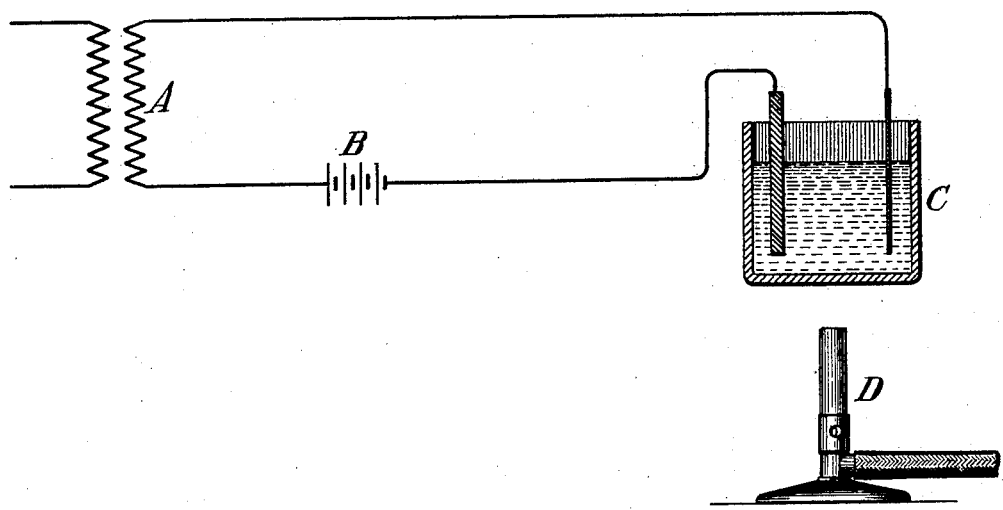
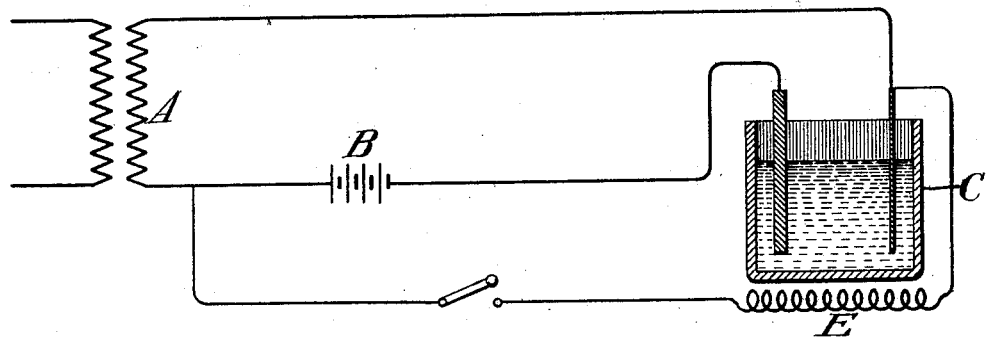
Witnesses:
R. A. Balderson.
E. T. McKeown.
Inventor:
Carl Hambuechen
By Byrnes & Townsend,
Attys.

No. 732,631. Patented June 30, 1903.

UNITED STATES PATENT OFFICE.

CARL HAMBUECHEN, OF MADISON, WISCONSIN.

ASYMMETRIC CONDUCTOR.

SPECIFICATION forming part of Letters Patent No. 732,631, dated June 30, 1903.

Application filed January 19, 1903. Serial No. 139,614. (No model.)

*To all whom it may concern:*

Be it known that I, CARL HAMBUECHEN, a citizen of the United States, residing at Madison, in the State of Wisconsin, have invented certain new and useful Improvements in Asymmetric Conductors, of which the following is a specification.

This invention is an improved asymmetrical conductor of which an electrolyte forms a part, said electrolyte consisting of a chemical compound or mixture of chemical compounds which is solid and non-conductive, or nearly so, at ordinary temperatures, but which in use is maintained in a fused or molten state or at such temperature as will render it sufficiently conductive. In connection with said electrolyte is used as an electrode a metal or metallic alloy which possesses the property of permitting the current to flow in one direction with greater readiness than in the reverse direction. My preferred electrode is composed of aluminium, which permits free passage of the current from the electrolyte, but which offers or interposes a very high resistance to a current in the reverse direction—that is to say, to a current passing or tending to pass from the aluminium as anode to the electrolyte. Asymmetric conductors of this type heretofore employed have used as electrolytes conductive solutions consisting generally of salts in aqueous solution. Such conductors, particularly when employed as rectifiers for alternating currents, work at low efficiency, the current losses arising from several factors, among which may be specified the internal resistance of the cell, the leakage current, and the electrolytic effect of the current in decomposing the electrolyte. These losses are for the most part converted into heat within the cell, and in consequence the temperature tends to rise. Such rise in temperature still further injuriously affects the efficiency of the cell and if permitted to extend beyond definite limits may destroy it in so far as useful effect is concerned. I have discovered that the difficulties and losses attendant upon the use of such solutions may be eliminated or greatly reduced by the use of a fused electrolyte and that other advantages are secured. The life of the electrodes is prolonged, and the electrolyte remains for a longer time in a condition for effective action, the efficiency of the cell as a whole is increased, the output for a given size of cell is very largely increased, and the heat generated within the cell in normal operation is less disadvantageous in that it does not raise the temperature to a point at which the cell breaks down or losses its efficiency. The heat so generated within the cell is, on the contrary, advantageously applied in maintaining the electrolyte at a suitable temperature at which it is a conductor of electricity.

A form of my invention is diagrammatically shown in the accompanying drawings, wherein—

Figure 1 represents my cell used as a rectifier, a gas-flame being employed to bring the electrolyte to an appropriate temperature. Fig. 2 is a similar representation in which the cell is electrically heated.

Referring to the figures, A indicates a source of alternating currents, shown as the secondary of a transformer, and B is a storage battery to be charged by the unidirectional current.

C is an electrolytic cell containing an electrolyte which is non-conductive at ordinary temperatures.

D is a lamp-burner or other suitable source of heat for bringing the electrolyte to a conductive condition. As shown in Fig. 2, this heat may be supplied to the cell by passing on electric current through a heating resistance E, which may be either inside or outside of the electrolytic cell.

The chief object of the heating means D is to heat the cell, bringing the electrolyte from a non-conductive to a conductive condition. After the cell is once started and in normal operation it operates without continual supply of external heat, the heat losses within the cell being usually sufficient to keep the electrolyte in a molten or conductive condition. Whenever by reason of the light load such heat losses are insufficient to maintain the electrolyte in a conductive condition, they may be supplemented by the application of heat from without.

Many salts and compounds may be employed as electrolytes—as, for instance, the nitrates of sodium, potassium or ammonium, sodium or potassium nitrite, and the hydroxids, chlorates, and bichromates of the alkali metals—or mixtures of such salts or compounds may be used. The composition of the electrolyte does not necessarily remain unchanged in use. For instance, if an alkali-metal nitrate is employed it may become partially converted in operation to nitrite, oxid, and, perhaps, other compounds which are held in solution or otherwise retained in the electrolyte.

The most suitable material for one of the electrodes is aluminium or an alloy thereof. For the other electrode any material may be used which offers less opposition than aluminium to the flow of the electric current. Preferably such material should be unattacked by the products of the electrolysis. Among such materials may be mentioned iron, cobalt, nickel, and platinum, iron being generally most available.

When the cells are employed for the rectification of alternating currents, they will usually be combined in accordance with known principles in such manner as to yield the highest rectifying effect. The cells may be employed as described for rectifying alternating currents and also in all other relations in which it is desirable to furnish a better path for the current in one direction than in the other. For instance, by applying an alternating pressure to the terminals of an electrolytic cell comprising electrodes of aluminium and iron in a fused electrolyte consisting of sodium hydroxid the electrolyte may be decomposed to yield metallic sodium.

I claim—

1. An asymmetric conductor comprising an electrolyte which is substantially non-conductive at ordinary temperatures, and electrodes, as set forth.

2. An asymmetric conductor comprising an electrolyte which is substantially non-conductive at ordinary temperatures, and electrodes, one of which is capable of interposing a greater resistance to the passage of an electric current in one direction than in the other, as set forth.

3. An asymmetric conductor comprising an electrolyte which is substantially non-conductive at ordinary temperatures, and a plurality of electrodes, one or more of which is capable of interposing a greater resistance to the passage of an electric current in one direction than in the other, as set forth.

4. An asymmetric conductor comprising an electrolyte which is substantially non-conductive at ordinary temperatures, electrodes, and means for applying heat to said asymmetric conductor, as set forth.

5. An asymmetric conductor comprising an electrolyte, which is substantially non-conductive at ordinary temperatures, electrodes, one of which is capable of interposing a greater resistance to the passage of an electric current in one direction than in the other, and means for applying heat to said asymmetric conductor, as set forth.

6. An asymmetric conductor comprising an electrolyte which is substantially non-conductive at ordinary temperatures, and electrodes, one of which contains aluminium, as set forth.

7. An asymmetric conductor comprising an electrolyte which is substantially non-conductive at ordinary temperatures, and electrodes, one of which is composed of aluminium, as set forth.

8. An asymmetric conductor comprising an electrolyte containing a salt, said salt being substantially non-conductive at ordinary temperatures, and electrodes, as set forth.

9. An asymmetric conductor comprising an electrolyte containing a mixture of salts, said mixture being substantially non-conductive at ordinary temperatures, and electrodes, as set forth.

10. An asymmetric conductor comprising an electrolyte containing an alkali salt, said salt being substantially non-conductive at ordinary temperatures, and electrodes, as set forth.

11. An asymmetric conductor comprising an electrolyte containing a mixture of alkali salts, said mixture being substantially non-conductive at ordinary temperatures, and electrodes, as set forth.

12. An asymmetric conductor comprising an electrolyte containing an alkali nitrate, said alkali nitrate being substantially non-conductive at ordinary temperatures, and electrodes, as set forth.

13. An asymmetric conductor comprising an electrolyte containing an alkali nitrate, said alkali nitrate being substantially non-conductive at ordinary temperatures, and electrodes, one of which contains aluminium, as set forth.

14. An asymmetric conductor comprising an electrolyte containing an alkali nitrate, said alkali nitrate being substantially non-conductive at ordinary temperatures, and electrodes, one of which is composed of aluminium, as set forth.

15. An asymmetric conductor comprising an electrolyte containing an alkali nitrate, said alkali nitrate being substantially non-conductive at ordinary temperatures, electrodes, and means for applying heat to said asymmetrical conductor, as set forth.

16. An asymmetric conductor comprising an electrolyte containing an alkali nitrate, said alkali nitrate being substantially non-conductive at ordinary temperatures, an aluminium electrode, and an iron electrode, as set forth.

17. An asymmetric conductor comprising an electrolyte containing an alkali nitrate, said alkali nitrate being substantially nonconductive at ordinary temperatures, an aluminium electrode, an iron electrode, and means for applying heat to said asymmetric conductor, as set forth.

In testimony whereof I affix my signature in presence of two witnesses.

CARL HAMBUECHEN.

Witnesses:
C. F. BURGESS,
W. D. HIESTAND.